UNITED STATES PATENT OFFICE.

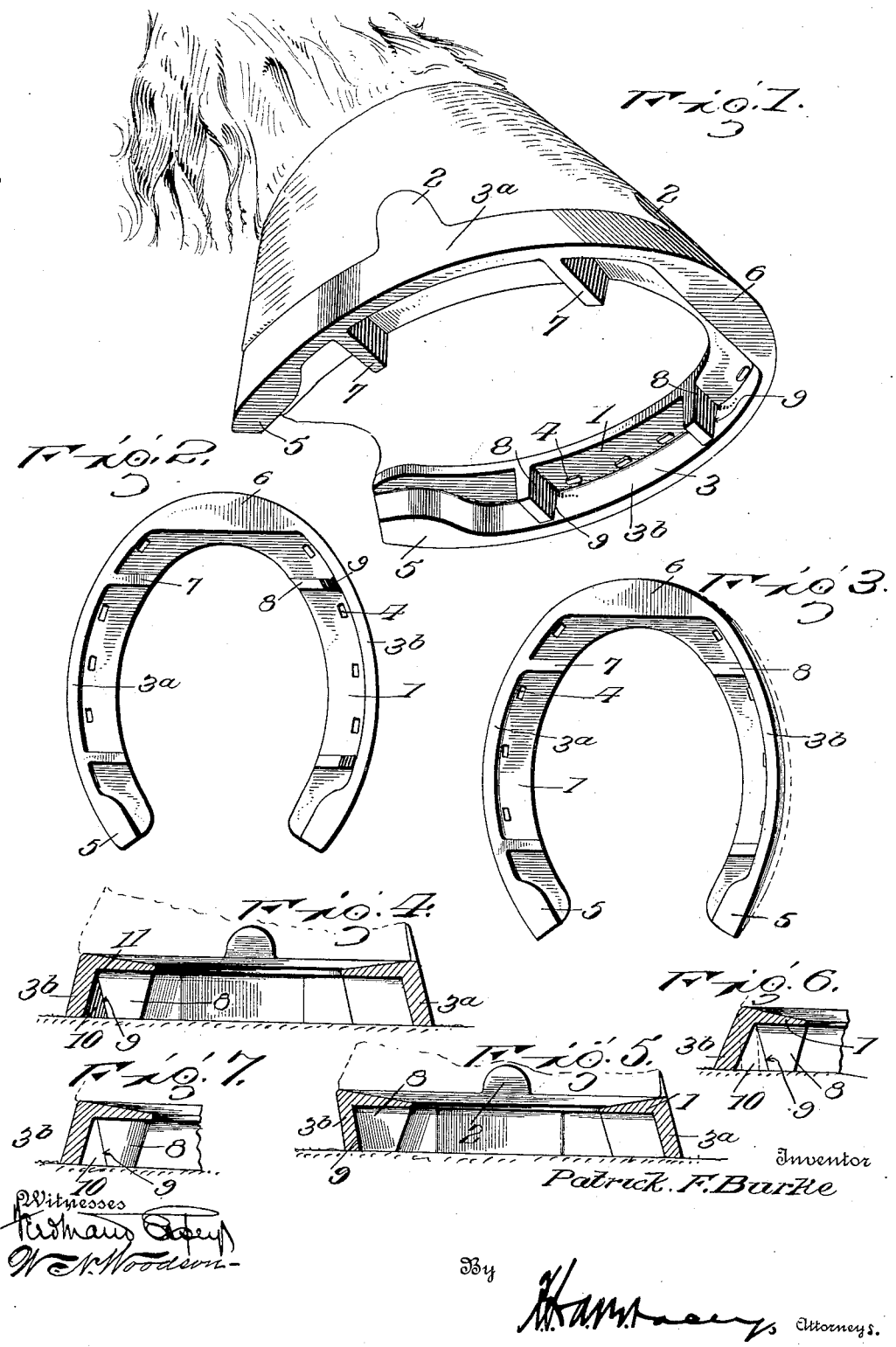

PATRICK F. BURKE, OF NEW YORK, N. Y.

HORSESHOE.

1,094,873. Specification of Letters Patent. Patented Apr. 28, 1914.

Application filed December 11, 1912. Serial No. 736,195.

*To all whom it may concern:*

Be it known that I, PATRICK F. BURKE, citizen of the United States, residing at New York, in the county of New York and State of New York, have invented certain new and useful Improvements in Horseshoes, of which the following is a specification.

This invention relates to horse shoes and has as its primary aim to provide a shoe adapted for ordinary use and which, when in use, will afford a firm support for the hoof, effectually prevent forward, backward or sidewise slipping on smooth or icy surfaces and prevent overturning of the hoof, and which, aside from its adaptation to ordinary use, will possess particular advantages in instances where the horse shod therewith has acquired the habit of walking "close." It is a well-known fact that a horse having this habit will, in walking, strike the inner side of one hoof against the opposite leg at or adjacent the fetlock joint, resulting in a laceration or a bruising of the skin and flesh. Particularly is injury likely to be caused when the shoe upon the hoof is provided with a depending flange for the outer surface of the flange is practically in every instance continuous with the outer surface of the hoof and the outline of its lower edge is consequently of greater diameter than the natural diameter of the under side of the hoof. The provision of such a flange is however, desirable, inasmuch as it prevents slipping of the hoof upon slippery surfaces and enables the horse to obtain a better foothold in the road surface, and it is therefore an aim of the present invention to provide a horse shoe having such a flange which shoe may, however, be readily and quickly adapted for use by a horse having the habit of walking "close."

Another aim of the present invention is to provide a horse shoe of such formation that its upper or hoof engaging side will conform to the under side of the hoof to which the shoe is applied and firmly and comfortably support the hoof.

For a full understanding of the invention reference is to be had to the following description and accompanying drawing, in which:—

Figure 1 is a perspective view of the shoe embodying the present invention, it being in condition for ordinary use and applied. Fig. 2 is a bottom plan view of the shoe in condition for ordinary use. Fig. 3 is a view similar to Fig. 2 but illustrating the condition of the shoe after its adaptation for use by a horse having the habit of walking "close." Fig. 4 is a vertical transverse sectional view in detail illustrating the condition of the shoe when adapted for ordinary use. Fig. 5 is a view similar to Fig. 4 illustrating the shoe in the condition shown in Fig. 3. Fig. 6 is a view illustrating a slight modification of the invention. Fig. 7 is a view similar to Fig. 5 illustrating a further modification.

Corresponding and like parts are referred to in the following description and indicated in all the views of the accompanying drawing by the same reference characters.

In the drawing the body of the shoe is indicated by the numeral 1 and so far as concerns its general outline is substantially of the ordinary form. The body is provided at suitable points, here shown as at the front and one side, with the usual upstanding clips 2 which rest against the surface of the hoof and serve to brace the connection of the shoe to the hoof. The body 1 is formed upon its under side and at its outer edge with a depending flange 3 which extends throughout the entire length of said outer edge of the body and which is preferably inclined so as to normally extend at all points, downwardly and outwardly with its outer surface continuous with the surface of the hoof. More specifically speaking, the shoe is exteriorly unguliform. The body 1 of the shoe is provided at intervals with the usual nail openings 4, these openings being located inwardly of the flange 3, as clearly shown in the first three figures of the drawing. The flange 3 at its ends, or in other words, at the heel of the shoe, is increased in thickness as indicated at 5 so as to form heel calks and the flange is similarly increased in thickness as at 6 at the toe of the shoe so as to form a toe calk. it being understood that the toe and heel are the parts of the shoe which receive the impacts and that by thickening the flange at these points accidental overturning of the flange is provided against and its efficiency as a means for preventing slipping on slippery surfaces, is increased. Between its thickened portions 5 and 6, or more specifically, at the sides of the shoe, the flange 3 is of uniform thickness and its thickness is considerably less than the width of the body of the shoe at the sides thereof.

For the sake of convenience in describing other structural features of the shoe, that portion of the flange at the outer side of the shoe is indicated specifically by the reference character 3ª and the opposite portion or that which is located at the inner side of the shoe is indicated by the character 3ᵇ. In order to brace the portion 3ª of the flange against overturning and to add to its efficiency as a means for preventing slipping of the shoe, lugs 7 are formed integral with the under side of the body 1 and the inner side of the said portion 3ª of the flange, and these lugs are preferably arranged one immediately rearwardly of the thickened portion 6 and the other immediately forwardly of the thickened portion 5 at the rear side of the shoe and the lugs preferably extend parallel and the entire width of the under side of the body 1 and the entire height of the flange at its said portion 3ª; furthermore, the lower edges of the lugs are preferably located in the plane occupied by the under edge of the flange 3, as a whole. At the opposite side of the shoe there are provided lugs 8 preferably arranged in substantially the same manner as the lugs 7. These lugs 8 are integral at their upper ends with the under side of the body 1 but are preferably spaced from the inner side of the portion 3ᵇ of the flange throughout their entire or substantially their entire height so that each lug 8 has a side or edge 9 which is presented toward or spaced from the inner side of the portion 3ᵇ of the flange and it is preferable that this edge or side 9 of each lug be inclined downwardly and inwardly, or in other words, in a direction opposite to the direction of inclination of the inner side of the said portion 3ᵇ of the flange so that an inverted V-shaped kerf 10 is formed between the said edges of the lugs and the said inner face of the flange.

In the form of the invention shown in Figs. 1 to 5 inclusive, the edge 9 of each lug 8 is spaced from the portion 3ᵇ of the flange except adjacent the upper end of the lug where it is integrally connected with the flange for a short distance, as at 11. However, this edge of each lug may be entirely spaced from the flange, or in other words the lug may be bodily removed or spaced from the flange, as shown in Figs. 6 and 7 of the drawing, and while the lugs are here shown as flat sided, they may be of invented frusto-conical form, as shown in Fig. 7, or in fact may take any other form found desirable or suitable, and it will furthermore be found that it is not absolutely essential that the lugs 7 and 8 be arranged in the precise relation shown in the several figures of the drawing, but they may extend at various angles with relation to the flange 3 and may be spaced apart a greater or less distance than here shown; also that a greater or less number of lugs may be employed than shown in the drawing.

When the shoe is in condition for ordinary use, the portion 3ᵇ of its flange will be inclined, as shown in Fig. 4 and spaced from the adjacent sides or edges of the lugs 8 and with the flange in this condition and in this relation to the said lugs 8, the shoe is adapted for use upon the hoofs of horses not having the habit of walking "close". When, however, a horse having this habit is shod with the shoes embodying the present invention, the blacksmith will strike in the portion 3ᵇ of the flange of the shoe so that it will rest against the inclined sides or edges of the lugs 8 in the manner shown in Fig. 5 of the drawing. It will be apparent that, while, as stated above, the portion 3ᵇ of the flange is struck in so as to rest against the sides or edges of the lugs 8, it may be left spaced a slight distance therefrom so as to assume more clearly a vertical position, but in any event it will be apparent that by striking in the flange in the manner shown and described, its sharp edge will be prevented from coming in contact with the animal's limbs at the fetlock joint and laceration of the skin and flesh will not be liable to occur. It is to be further noted that if the portion 3ᵇ of the flange has been struck-in to position against the lugs 8, it will be firmly braced by the lugs and will not be liable to be further overturned or battered down.

By referring to Figs. 4 and 5 it will be noted that the body 1 of the shoe is inclined downwardly and inwardly, continuously, from its outer to its inner edge so that the upper side of the shoe may be said to be concave and, being of this form, it will more perfectly conform to the contour of the under side of the hoof against which it is secured and the hoof will be more firmly and comfortably supported than would otherwise be the case. Of course, in manufacturing the shoes they will be made "right" and "left", the shoes being always applied with the portions 3ᵇ of their flange presented inwardly or in other words, toward the opposite hoof.

Having thus described the invention what is claimed as new is:—

1. A horse shoe having a body provided with a depending flange, and lugs integral with and projecting from the under side of the body at each side of the shoe, the lugs at the outer side of the shoe being also integral with the said flange and the lugs at the inner side of the shoe being spaced from the flange and having their sides which are presented toward the flange inclined upwardly toward the flange and merging with the same substantially at the line of juncture of the flange with the body of the shoe.

2. A horse shoe having a body provided with a depending flange, and lugs integral with and projecting from the under side of the body at each side of the shoe, the lugs at the outer side of the shoe being also integral with the said flange and the lugs at the inner side of the shoe being spaced from the flange and having their sides which are presented toward the flange inclined upwardly toward the flange and merging with the same substantially at the line of juncture of the flange with the body of the shoe and arranged to constitute supports for the flange when the flange is struck-in to position thereagainst.

3. A hores shoe comprising a body having a downwardly and outwardly inclined flange located at its outer edge and lugs projecting from the under side of the body and each having a side spaced from the flange and inclined downwardly and inwardly, the angle of inclination of the said side of each lug and the opposing portion of the flange being substantially the same and the lower edge of the flange and the lower ends of the lugs occupying the same horizontal plane.

In testimony whereof I affix my signature in presence of two witnesses.

PATRICK F. BURKE. [L. S.]

Witnesses:
J. D. YOAKLEY,
SAMUEL N. ACKER.

Copies of this patent may be obtained for five cents each, by addressing the "Commissioner of Patents, Washington, D. C."